Inventor
CHARLES RAYMOND MANFORD
By Sughrue, Rothwell,
Mion, Zinn & Macpeak
Attorneys United States Patent Office 3,689,304
Patented Sept. 5, 1972

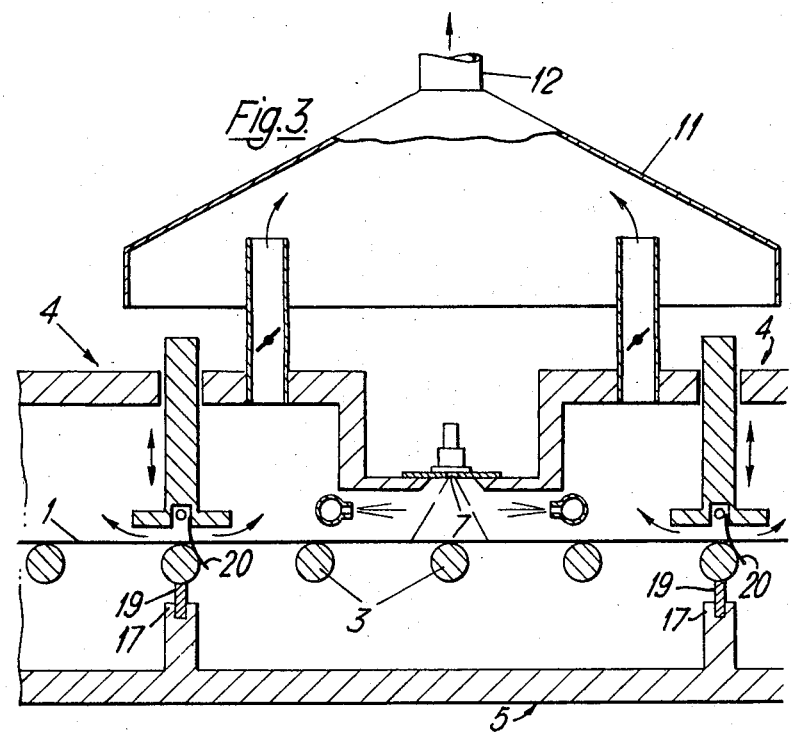
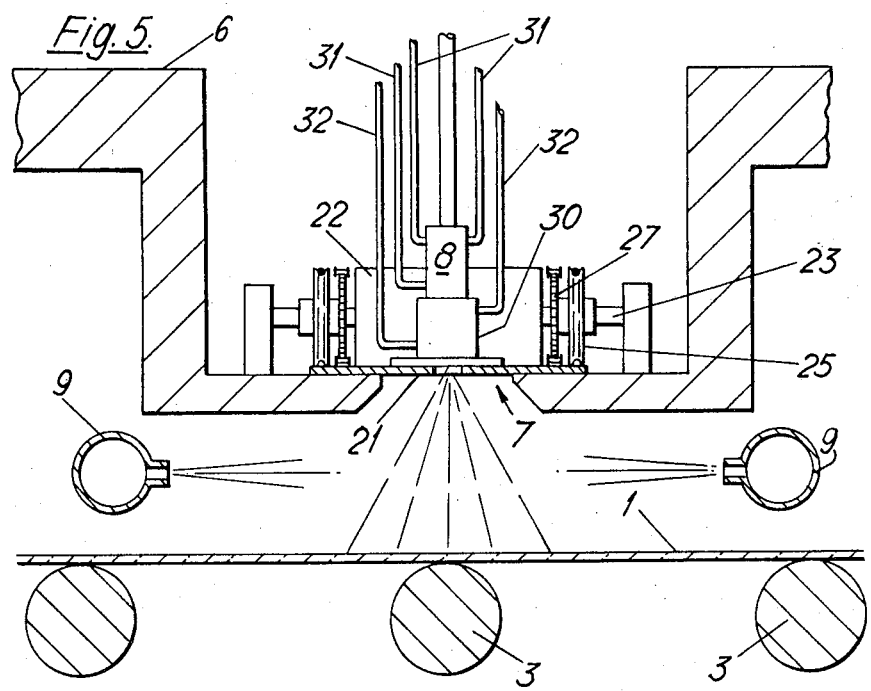

3,689,304
TREATING GLASS
Charles Raymond Bamford, Ormskirk, England, assignor to Pilkington Brothers Limited, Liverpool, England
Filed Apr. 22, 1970, Ser. No. 30,719
Claims priority, application Great Britain, Apr. 23, 1969, 20,769/69
Int. Cl. C03c 17/22
U.S. Cl. 117—54                18 Claims

ABSTRACT OF THE DISCLOSURE

A hot glass ribbon is coated with a metal oxide by passing the ribbon through an enclosed chamber, and at the same time directing a selected compound in an organic solvent against the ribbon, the compound being such as to react on contacting the hot glass to produce a metal oxide coating. A flame inhibiting atmosphere is maintained within the enclosed chamber, the atmosphere being continuously displaced and being maintained at a temperature sufficiently high to prevent detrimental cooling effects on the ribbon.

BACKGROUND OF THE INVENTION (1) Field of the invention

This invention concerns improvements in or relating to treating glass, and more particularly relates to coating glass with a metal oxide.

(2) Description of the prior art

It is known that a glass surface can be coated with a metal oxide to effectively impart to the glass desired mechanical, electrical or optical properties. In some cases the required thickness of the coating is not unduly critical, but in many instances, and notably when the coating is to impart desired optical properties, a precise and uniform coating thickness of high quality is necessary.

Various proposals have been made for applying metal oxide coatings to glass surfaces. Notably it has been proposed to provide glassware, such as bottles, with a titanium oxide coating to increase the scratch-resistance, by spraying the ware with an organic titanium compound. It has been proposed to spray the hot glassware as it issues from a forming machine and during its travel to an annealing lehr, the titanium compound decomposing to form the oxide when it strikes the hot glass. It has further been proposed to spray the glassware when cold and then heat the latter to effect the required decomposition of the organic compound and formation of the oxide. However, when coating glassware, such as bottles, a high degree of uniformity and quality in the coating is not generally essential.

If it is attempted to apply these proposals to the uniform and high quality coating of a continuous glass ribbon in a normal flat glass production line serious difficulties are encountered. In particular, the formed glass ribbon is necessarily maintained in a controlled hot environment during its annealing and an attempt to spray onto the ribbon through the hot environment meets with the possibility of the spray compound decomposing prior to striking the glass. If it were attempted to overcome this problem by creating a cold environment adjacent the ribbon, this might have an adverse cooling effect on the ribbon, and could give rise to the risk of the glass shattering. Also, if it is suggested that the spray should be applied to the glass ribbon after the annealing stage of the flat glass production line, i.e. when the glass is cold, then it would be necessary to include a further heating station in the line, which would be uneconomical and which could not generally be done in an existing line.

A further problem encountered if it is attempted to spray in a hot environment with many organo-metallic compounds, and particularly when in an organic solvent, is the risk of fire, since the compound, or the solvent, or resulting decomposition products are often inflammable. It has been previously been proposed in relation to the coating of glassware, and with this problem of fire risk in mind, to apply an organic titanium compound dissolved in aqueous solution. It has been found, however, that in many cases a film of superior quality and uniformity can be obtained when an organic solvent is employed. An additional problem encountered with some compounds and solvents lies in toxicity and resultant health risks or in corrosive properties.

SUMMARY

A surface of a continuous glass ribbon is coated with a metal oxide by passing a hot glass ribbon through a substantially enclosed region, directing a selected compound in an organic solvent against at least one surface of the ribbon to effect a controlled deposition thereon during its travel through said region, the compound being such as to react on contacting the hot glass to produce a metal oxide coating, effecting a continuous positive displacement of flame inhibiting atmosphere in said region by maintaining a flow of flame inhibiting gas thereinto and therefrom, and maintaining adjacent the ribbon during its travel through said region a temperature sufficiently high to prevent detrimental cooling effects on the ribbon.

The invention also includes a glass ribbon having a coating of metal oxide on at least one surface produced by the method of the invention, and a sheet of glass cut from such a ribbon.

Apparatus for coating a surface of a continuous glass ribbon with a metal oxide while the ribbon is hot and travelling through a hot environment, comprises enclosure means arranged substantially to enclose a region through which the ribbon travels, deposition means arranged to direct a selected compound in an organic solvent against at least one surface of the ribbon to effect a controlled deposition thereon during its travel through said region, the compound being such as to react on contacting the hot glass to produce a metal oxide coating, and gas feeding and extraction means arranged to maintain a flow of flame inhibiting gas into and from said region so as to maintain therein a flame inhibiting atmosphere whose temperature adjacent the ribbon is sufficiently high to prevent detrimental cooling effects on the ribbon.

BRIEF DESCRIPTION OF THE DRAWINGS

FIG. 3 is a view similar to FIG. 2 showing a modification;

FIG. 5 is a more detailed section through the spray station of the coating apparatus shown in any of FIGS. 1 to 4.

DESCRIPTION OF THE PREFERRED EMBODIMENTS

Figure 1:
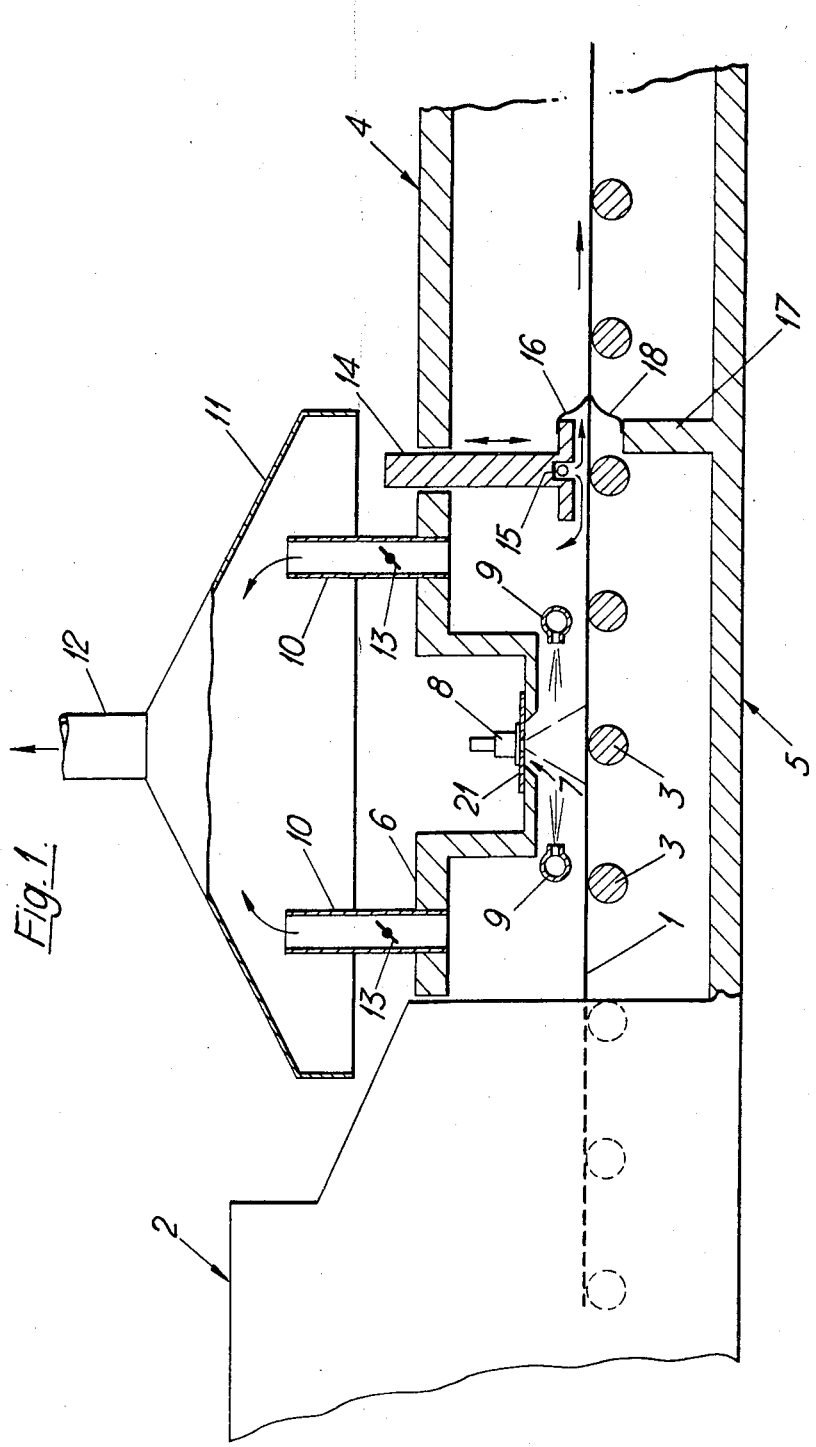
FIG. 1 is a section through, by way of example, an apparatus for coating the upper surface of a continuous glass ribbon.

FIG. 1 shows schematically a continuous horizontal glass ribbon 1 issuing from a forming area, generally indicated as 2, in which molten glass is formed into the ribbon in known manner. The glass ribbon is continuously fed forwardly (to the right as viewed in FIG. 1) by driven rollers 3 on which the ribbon is supported. Downstream of the forming area the glass ribbon travels through a lehr, generally indicated as 4, in which the temperature is controlled, in well known manner, to effect annealing of the glass ribbon.

Disposed between the forming area 2 and the lehr 4 is a spray station, generally indicated as 5, through which the ribbon passes. The station 5 comprises a stepped ceiling 6 having a central lower portion provided with a slot 7 extending normal to the direction of travel of the ribbon 1. A spray gun 8, arranged to traverse back and forth along the slot 7, directs a spray of an organo-metallic compound in an organic solvent onto the upper surface of the ribbon 1 travelling beneath, the spray being either in liquid or atomised form.

A pair of manifolds 9 extend acros the spray station at positions above the ribbon and at equal distances upstream and downstream from the slot 7 through which the spray gun directs its spray. The manifolds 9 have outlet holes facing the spray so that gas issuing from the manifolds is directed towards the spraying area, i.e. the area through which the spray compound travels towards the glass surface.

The ceiling 6 of the spray station 5 is provided with two exhaust ducts 10 which lead into a hood or canopy 11, having a central exhaust duct 12, and suspended over the spray station. Each exhaust duct 10 incorporates a butterfly valve 13 which can be adjusted to regulate the flow through the duct, and an extraction system (not shown) connects with the duct 12.

A vertically adjustable gate 14 is positioned above the ribbon 1 between the station 5 and the lehr 4. A slot in the base of the gate 14 houses a manifold 15 from which gas issues at a pressure such that it flows between the the base of the gate and the upper surface of the ribbon in both directions, i.e. towards the lehr and towards the spray station. This arrangement effects a seal, more fully described in U.S. patent specification No. 3,351,451 whereby passage of gas between the lehr atmosphere and the spray station atmosphere over the ribbon, can be substantially prevented. A flexible apron 16 attached to the base of the gate 14 and projecting downwardly therefrom, assists in effecting this seal. The canopy 11 extends over the gate 14 so that gas escaping through the space between the spray station and lehr ceilings in which the gate is accommodated, is collected by the canopy for exhaust through the duct 12.

Beneath the ribbon 1 the lehr and spray station are separated by a vertical wall 17 having an upwardly projecting flexible apron 18 attached to its top surface to provide a seal between the wall 17 and the lower surface of the ribbon.

Suitable sealing devices (not shown), which may be essentially the same as those between the spray station and the lehr, are provided at the exit from the forming area 2 to prevent any substantial ingress of gas from the forming area atmosphere into the spray station atmosphere.

The spray station thus comprises a substantially enclosed chamber or region in which a desired atmosphere can be established and maintained.

The basic operation of the apparatus so far described is as follows:

The hot ribbon 1 issuing from the forming area 2 is continuously fed forwardly through the substantially enclosed chamber of the spray station 5 and into the lehr 4. During travel through the spray station, the upper surface of the ribbon 1 has a suitable organo-metallic compound in an organic solvent directed against it through the action of the traversing spray gun 8, which effects a controlled deposition of the compound on the surface. On contacting the hot glass surface, the compound reacts to form a metal oxide. A suitable flame inhibiting atmosphere is maintained in the substantially enclosed chamber of the spray station by the continuous feed of an appropriate gas through the manifolds 9 and the exhaust of gas and decomposition products through the ducts 10. The spray station atmosphere is maintained at a plenum of a desired pressure by adjusting the valves 13. The atmosphere in the spray station is further maintained at a desired temperature, such that the hot ribbon 1 is not subjected to detrimental cooling effects, and the gas fed through the manifolds 9 may be preheated to assist in the maintenance of the desired temperature. The ribbon having a metal oxide coating on its upper surface issues from the spray station into the lehr in which it undergoes normal annealing.

Figure 2:
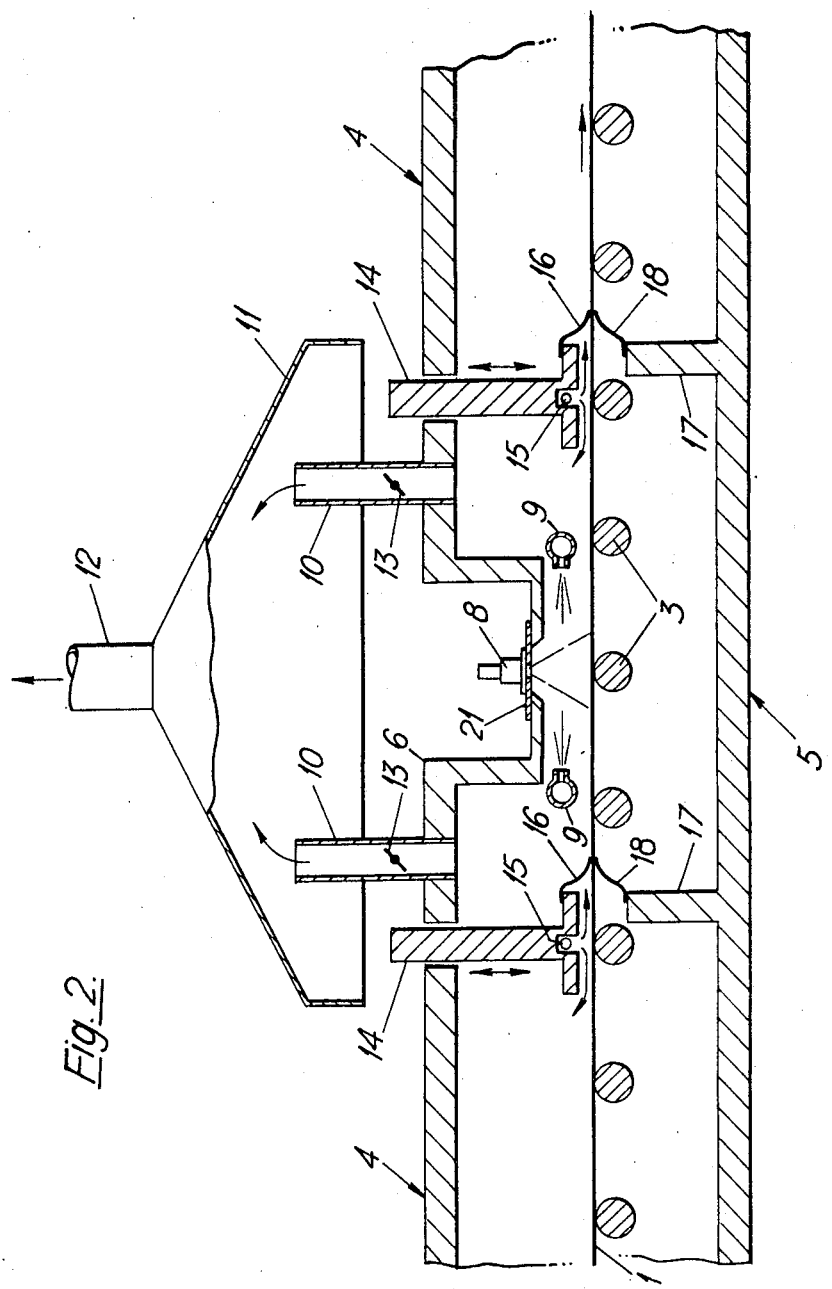
FIG. 2 is a section through a lehr incorporating the coating apparatus shown in FIG. 1.

FIG. 2 schematically shows an arrangement similar to that of FIG. 1 (and uses the same reference numerals to indicate the same parts), but in which the spray station 5 is located in the lehr 4 at a suitable position along its length. The separating and sealing arrangement described with reference to FIG. 1 between the spray station and the lehr is, in the arrangement of FIG. 2, duplicated so as to lie on both sides of the spray station. The atmosphere of the spray station is thus effectively sealed from that of the lehr. Where the spray station is disposed within the lehr, as shown in FIG. 2, the atmosphere of the spray station is preferably maintained at a temperature which accords with the desired temperature of the lehr at that position.

FIG. 3 shows an arrangement generally similar to that of FIG. 2 but in which the sealing devices which separate the spray station atmosphere from the lehr atmosphere are different in some aspects. In the arrangement of FIG. 3 the rollers 3 which feed the glass ribbon forwardly are so disposed that a roller 3 lies vertically above each of the walls 17. A carbon brush 19 is mounted in the upper end of each wall 17, and bears against the roller 3 thereabove to effect a seal. Additionally, a drape 20 hangs from each gate 14 at each side of the glass ribbon 1 to provide seals at the sides of the ribbon.

Figure 4:
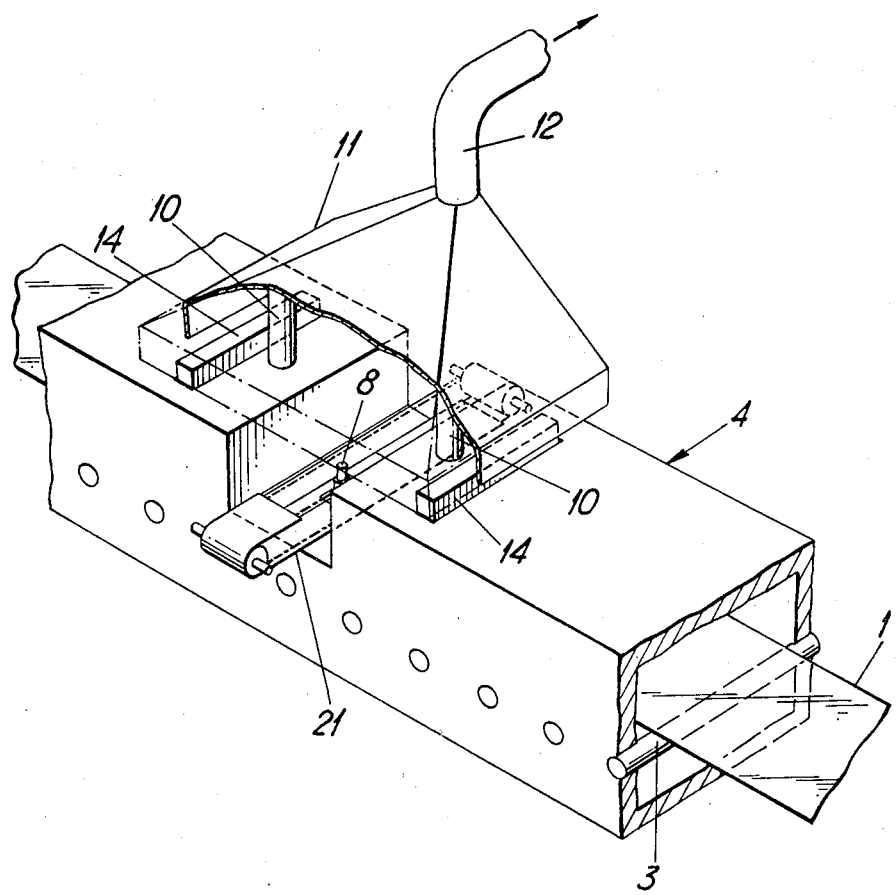
FIG. 4 is a perspective view of the lehr shown in FIG. 2 or FIG. 3, partly broken away.
Figure 6:
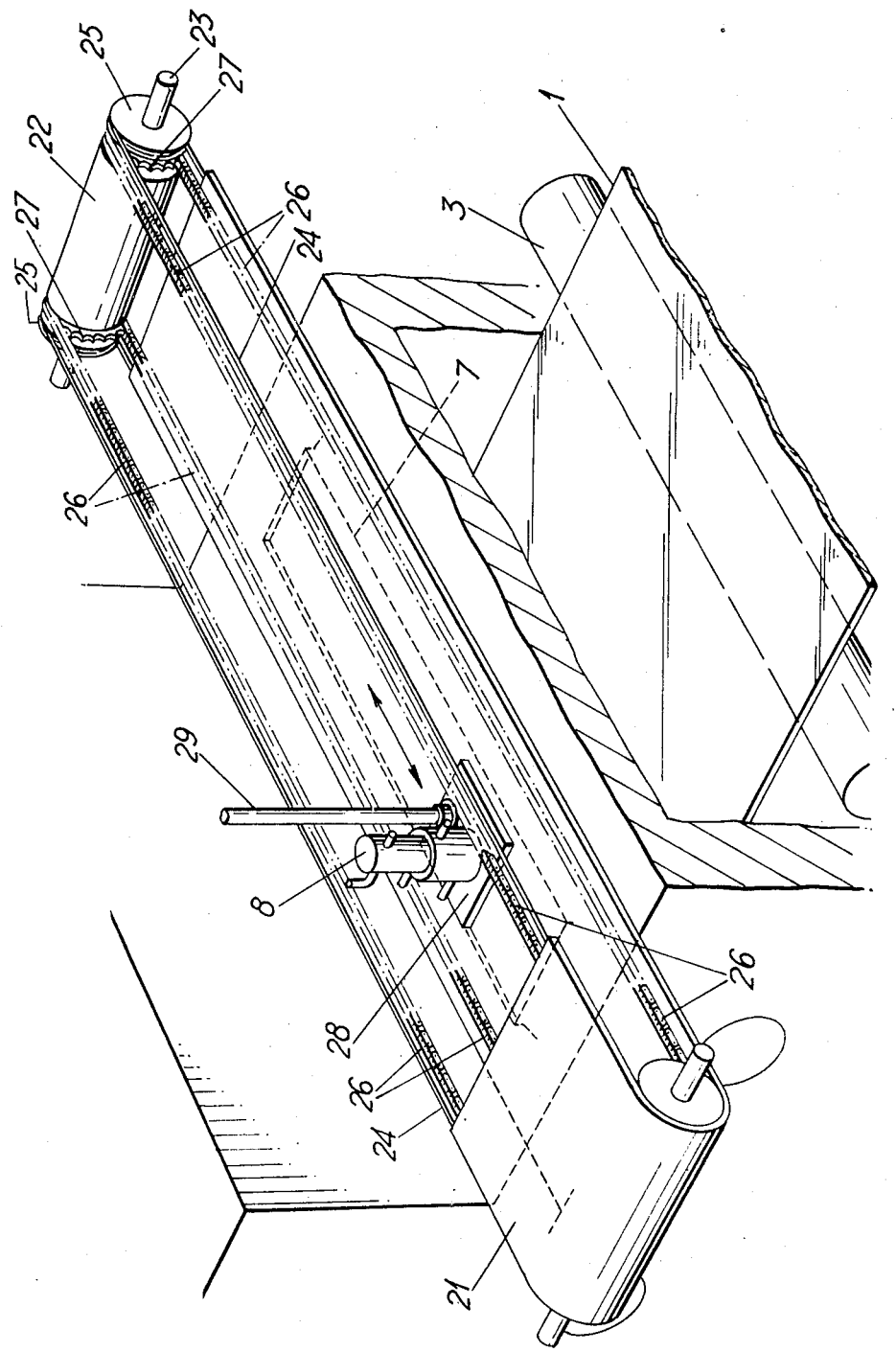
FIG. 6 is a perspective view of the apparatus shown in FIG. 5.

FIG. 4 shows the lehr 4 having the spray station 5 at a suitable position therealong, and shows a sealing belt 21 associated with the traversing spray gun 8. The sealing belt arrangement, and its relationship to the spray gun, are shown in greater detail in FIGS. 5 and 6.

The sealing belt arrangement comprises an asbestos belt 21 passing round, and having a horizontal lower run between, end rollers 22 carried on shafts 23. The ends of the belt 21 are in spaced relationship and are connected by side wires 24 which pass round pulleys 25 mounted on the shafts 23 (see the right hand end of the belt 21, as viewed in FIG. 6). A pair of endless chains 26 passing round sprockets 27 on the shafts 23 assist to hold the belt in the required position during movement thereof.

The belt 21 has an aperture in its lower run through which the spray gun 8 can act, the latter being mounted on a plate 28 secured to the belt and having an aperture over the aperture in the belt. A drive rod 29 is attached to the plate 28 and extends vertically through the space between the ends of the belt. Supply connections 31 to the spray gun 8 and pipes 32 leading to a water cooling jacket 30, also pass through the space between the ends of the belt 21.

The spray gun 8 is traversed back and forth along the slot 7 in the spray station ceiling by means of a suitable drive mechanism (not shown) which acts to reciprocate the drive rod 29 along the required path. This transverse movement of the spray gun 8 and plate 28 effects corresponding movement of the belt 21. By this arrangement, therefore, the slot 7 is sealed by the belt 21 while the spray gun acts through the apertures in the plate 28 and the belt 21 during traverse along the slot.

The temperature of the glass where deposition occurs may be within the range 300° C. to 800° C. and the temperature of the atomsphere adjacent the glass in said enclosed region may also be within the range 300° C. to 800° C. but, in any particular case, the temperature of the glass need not necessarily be the same as the temperature of the atmosphere. A preferred temperature range for the glass is 450° C. to 700° C. In general, the temperatures of the glass and of the atmosphere adjacent the glass in said enclosed region are arranged, in relation to the compound used in any particular case, to give optimum deposition conditions consistent with avoidance of detrimental cooling effects on the glass, and preferably with minimum disturbance of the normal annealing process. By avoiding or minimising such disturbance the invention can readily be incorporated in a existing glass ribbon production line.

The particular compound sprayed by the gun 8 is selected to produce the required metal oxide coating on the glass and the organic solvent is selected to be suitable for the compound employed. The concentration of the compound in the solvent and the rate of spray are arranged so that sufficient of the compound contacts the glass to produce an oxide coating of the required thickness allowance being made where necessary for some partial decomposition of the compound during its travel through the hot environment towards the glass.

The organo-metallic compound may be an oxygen containing organo-metallic compound the metal oxide being formed by utilisation of oxygen contained in the compound. As examples a solution of 2 to 15% by weight of ferric acetylacetonate in toluene or a solution of 2 to 15% by weight of cobalt octate in isopropanol, may be sprayed on to the glass ribbon where the latter is at a temperature of 550° C. to 650° C. to yield an iron oxide or a cobalt oxide coating respectively. An iron oxide coating or a cobalt oxide coating of thickness between 500 and 1000 angstrom units has an overall optical reflectivity in the visible and near infra-red spectral regions of between 30% and 40%, as well as optical absorption effects.

Other examples of compounds and solvents that may be used and of the coatings produced are as follows:

Example I.—A solution of 3% by weight of cobalt octoate in toluene is sprayed on to a glass ribbon at about 580° C. The rate of spray is 30 to 35 ml./sq. ft. The resultant coating of cobalt oxide is of bronze transmission, has a thickness of about 500 angstrom units and 30% average reflection of solar energy.

Example II.—A solution of 2½% by weight of iron acetyl acetonate in a mixture of methanol/toluene or toluene alone is sprayed at a rate of 30 to 35 ml./sq. ft. on to a glass ribbon at about 580° C. The coating of iron oxide is of yellow-orange transmission, has a thickness of about 500 angstrom units and 30% average reflection of solar energy.

Example III.—A solution of 1% by weight of stannous octoate in toluene is sprayed at a rate of 30 to 35 ml./sq. ft. on to a glass ribbon at about 580° C. The coating of stannic oxide has a thickness of about 500 angstrom units. This coating also has no significant optical effect but provides a surface of enhanced scratch resistance.

Example IV.—A solution of 5% by weight of stannous octoate in toluene is sprayed at a rate of 30 to 35 ml./sq. ft. on to a glass ribbon at about 580° C. The resultant coating of stannic oxide is of neutral transmission, has a thickness of about 500 angstrom units and 15% average reflection of solar energy.

Example V.—A solution of 5% by weight of titanium acetyl acetonate in isopropyl alcohol is sprayed at a rate of 30 to 35 ml./sq. ft. on to a glass ribbon at about 580° C. The resultant coating of titanium dioxide is of silver transmission, has a thickness of about 500 angstrom units and 25% average reflection of solar energy Still further examples are listed as follows:

| Metal oxide | Compound | Solvent |
| --- | --- | --- |
| Iron oxide | Ferric chloride | Methanol. |
| Chromium oxide | Chromium acetyl acetonate | Toluene. |
| Cobalt oxide | Cobalt acetyl acetonate | Do. |
| Zirconium oxide | Zirconium acetyl acetonate | Do. |
| Titanium dioxide | Butyl titanate | Isopropanol or butanol. |

The concentration of the compound in the solvent, and the rate of feed of the solution are preferably chosen, relative to the rate of travel of the ribbon and its surface area, to produce a uniform coating of desired thickness. Some decomposition of the compound may occur prior to its striking the glass ribbon, and the rate of feed and concentration may therefore be such as to allow for such partial decomposition so that sufficient of the compound comes into contact with the glass surface to produce an oxide coating of the required thickness.

The gas fed through the manifolds 9 is such as to maintain in the substantially enclosed chamber of the spray station a flame inhibiting atmosphere of low oxygen content. The gas may be nitrogen, and the gas fed to the seal manifolds 15 may also be nitrogen. Where the spray gun 8 is of a form which utilises a gas as a propellant, the propellant gas may also be nitrogen. The gas fed into the chamber effects a continuous displacement of the atmosphere therein so that a flame-inhibiting atmosphere is maintained, thereby avoiding fire risks due to the possible inflammability of the solvent and/or decomposition products of the compound, and so as to effect a continuous flushing of decomposition products and possibly toxic fumes from the chamber into the extraction system.

The requirement for a flame inhibiting atmosphere in said enclosed region may be achieved by ensuring that the oxygen content of the atmosphere does not rise above a set level. The acceptable level should usually incorporate a safety factor, and may depend on the particular compound and solvent being used and on the temperature of the atmosphere. As examples, an oxygen content of less than 6% may be satisfactory up to 600° C. and less than 4% up to 800° C. The gas caused to flow into said enclosed region may be nitrogen. The positive displacement of the atmosphere in the enclosed region by the flow of gas thereinto and therefrom serves to effect a continuous flushing whereby decomposition products are continuously exhausted therefrom.

The oxygen content in the enclosed chamber may be controlled by means of an oxygen monitor disposed in or associated with the spray enclosure to sense the amount of oxygen present and to control a valve controlling an oxygen feed to the chamber or, alternatively, to control a servo-mechanism which controls that valve. The oxygen feed could be combined with the atomising gas for the spray or the flame inhibiting gas, e.g. the nitrogen, fed into the enclosure through the manifolds 9. The lower limit of the oxygen content within the enclosed chamber has been found to be 0.5% to 1% to obtain the required quality of coating. The upper limit of the oxygen content is that which is compatible with safety, i.e. safety in the gases which are extracted from the enclosed chamber and which include inflammable solvents and oxygen. Preferably there is maintained an excess of nitrogen in the flame inhibiting atmosphere and the amount of oxygen present is controlled by the oxygen monitor, A ratio of nitrogen to solvent vapour, for example, 10:1 has been found to be desirable in order to minimise the fire risk should the solvent leak accidentally.

The temperature of the atmosphere in the spray station chamber is such as to avoid detrimental cooling effects on the glass ribbon, and the necessary temperature will normally be controlled to accord with the temerature of the glass ribbon passing through the spray station. As explained previously, the temperature of the atmosphere may be maintained at a desired level by preheating the gas fed thereinto through the manifolds 9. Where the spray station is located immediately after the forming area and prior to the annealing lehr, as in the arrangement of FIG. 1, the temperature of the glass ribbon will normally be higher than when the spray station is located part way along the lehr, as in the arrangements of FIGS. 2 and 3. The spray station is preferably located at a position where the temperature of the glass ribbon during its normal formation and annealing is optimum for the spraying action in relation to the compound used, or, where it is required to use different spray compound at different times, where the temperature of the ribbon is of optimum suitability for the range of spray compounds.

It will be appreciated that the particular arrangements shown and described are given solely by way of illustration and example, and that modified or other forms of apparatus may be utilised. Notably, instead of using a single traversing spray gun, a static spray gun, or a plurality of static spray guns, or a plurality of traversing spray guns, or a combination of static and traversing spray guns may be employed. The or each spray gun may spray the compound and solvent in liquid form, or may be of a form which uses gas as a propellent, or may be of a different form e.g. electrostatic.

Also, instead of using one or more spray guns, the deposition of the selected compound may be effected by other means. For example, the selected compound may be deposited by a known form electrostatic spray device in which a V-shaped hopper extends across the path of travel of the glass ribbon. Such means do not involve the use of a moving spray gun, and are thus advantageous especially at the highest temperatures envisaged for the glass.

The particular spraying arrangement used should be selected to suit requirements with the general object of giving as uniform a deposition as possible on the glass surface being coated to provide an oxide coating of acceptable quality. If it is desired to vary the oxide coating thickness across the ribbon, e.g. to provide a coating having maximum thickness at one side of the ribbon decreasing to minimum thickness at the other side of the ribbon, the spray arrangement may be adapted to give a correspondingly graduated deposition across the ribbon.

Further, in the illustrative embodiments shown and described deposition is made on one surface only of the ribbon. If desired, deposition may be made on both surfaces of the ribbon. Yet further, the invention is shown and described as applied to a horizontal ribbon. The invention may be applied in an essentially similar manner, to a ribbon having a different disposition, e.g. vertical ribbon.

Still further, in the embodiments shown and described a single layer coating is applied to the glass ribbon surface. It will be appreciated that, if desired, a multiple layer coating may be applied to a surface of the ribbon by passing the latter through successive spray stations.

The successive sprayings on the ribbon may be applied in separate spray enclosures disposed along the length of the path of the ribbon, or may be applied successively within the same spray enclosure. Also, the successive sprayings may comprise applying the same compound two or more times onto the ribbon, one layer upon another, or, alternatively, different compounds one upon another. In the latter case, the compounds may themselves be incompatible and so cannot be sprayed together.

I claim:

1. A method of coating a surface of a continuous glass ribbon with a metal oxide, comprising passing a hot glass ribbon through a substantially enclosed region, directing a selected compound in an organic solvent against at least one surface of the ribbon to effect a controlled deposition thereon during its travel through said region, the compound being such as to react on contacting the hot glass to produce a metal oxide coating, feeding into said region separately from said selected compound in an organic solvent a flame inhibiting gas and extracting gas from said region thereby to effect a continuous positive displacement of flame inhibiting atmosphere in said region, and maintaining adjacent the ribbon during its travel through said region a temperature sufficiently high to prevent detrimental cooling effects on the ribbon.

2. A method according to claim 1, wherein said deposition is effected substantially immediately after formation of the ribbon and prior to its annealing, the ribbon passing through said enclosed region during its travel from a forming area to an annealing lehr.

3. A method according to claim 1, wherein said deposition is effected during annealing of the ribbon, the ribbon passing through said enclosed region during its travel along an annealing lehr.

4. A method according to claim 3, wherein the temperature of the atmosphere in said enclosed region is controlled to accord with the required lehr temperature at the position of said enclosed region along the lehr.

5. A method according to claim 1, wherein the temperature of the atmosphere in said enclosed region is maintained at a desired level by preheating said flame inhibiting gas which is fed into said region.

6. A method according to claim 1, wherein the compound is an organo-metallic compound in an organic solvent which is sprayed in liquid form onto the surface of the ribbon.

7. A method according to claim 1, wherein the compound is an acetyl acetonate.

8. A method according to claim 1, wherein the compound is ferric acetylacetonate and the organic solvent is toluene.

9. A method according to claim 1, wherein the compound is cobalt octoate and the organic solvent is isopropanol.

10. A method according to claim 1, wherein the compound is ferric chloride and the organic solvent is methanol.

11. A method according to claim 1, wherein the temperature of the glass where deposition occurs is within the range 300° C. to 800° C. and the temperature of the atmosphere adjacent the glass in said enclosed region is also within the range 300° C. to 800° C.

12. A method according to claim 1, wherein a flame inhibiting atmosphere in said enclosed region is achieved by maintaining the oxygen content of the atmosphere sufficiently high to allow the production of the metal oxide coating and yet sufficiently low to maintain the flame-inhibiting characteristic of the atmosphere.

13. A method according to claim 1, wherein said flame inhibiting gas fed into said enclosed region is nitrogen.

14. A method according to claim 11, wherein the temperature of the glass where deposition occurs is within the range 450° C. to 700° C.

15. A method according to claim 1, including spraying said selected compound in an organic solvent on to one surface of the ribbon from a spray gun.

16. A method according to claim 15, including traversing the spray gun back and forth across the ribbon.

17. A method according to claim 1, including directing said flame inhibiting gas towards the area of the glass surface where deposition of said selected compound in an organic solvent occurs.

18. A method according to claim 17, including directing said flame inhibiting gas towards said area from opposite sides thereof.

References Cited
UNITED STATES PATENTS

| | | | |
|---|---|---|---|
| 3,081,200 | 3/1963 | Tompkins | 117—106 X |
| 3,004,875 | 10/1961 | Lytle | 117—105.3 X |
| 2,689,803 | 9/1954 | Ackerman | 117—105.3 X |

RALPH S. KENDALL, Primary Examiner

U.S. Cl. X.R.

117—105.3, 119, 124 A, 124 T; 65—60